United States Patent
Liang

(10) Patent No.: US 8,724,663 B2
(45) Date of Patent: May 13, 2014

(54) IMPLEMENTATION METHOD AND SYSTEM, MAIN CONTROL DEVICE AND SMART CARD FOR INFORMATION TRANSMISSION

(75) Inventor: Guohe Liang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 57 days.

(21) Appl. No.: 13/583,623

(22) PCT Filed: Mar. 3, 2011

(86) PCT No.: PCT/CN2011/071490
§ 371 (c)(1),
(2), (4) Date: Sep. 7, 2012

(87) PCT Pub. No.: WO2011/140853
PCT Pub. Date: Nov. 17, 2011

(65) Prior Publication Data
US 2012/0327819 A1    Dec. 27, 2012

(30) Foreign Application Priority Data
May 14, 2010    (CN) .......................... 2010 1 0176989

(51) Int. Cl.
H04L 5/14    (2006.01)
H04J 3/06    (2006.01)
G06F 1/12    (2006.01)
G06F 1/00    (2006.01)

(52) U.S. Cl.
USPC ........... 370/503; 370/295; 713/400; 713/500; 713/600

(58) Field of Classification Search
CPC ................................. H04J 3/0638; H04L 5/16
USPC .......... 370/282, 295, 503, 522; 713/400, 500, 713/501, 600
See application file for complete search history.

(56) References Cited

U.S. PATENT DOCUMENTS 5,487,084 A * 1/1996 Lindholm ...................... 375/215
5,778,322 A * 7/1998 Rydbeck ........................ 455/558
(Continued)

FOREIGN PATENT DOCUMENTS

CN    2606387 Y    3/2004
CN    1830193 A    9/2006
(Continued)

OTHER PUBLICATIONS

P.R. China, State Intellectual Property Office, International Search Report for International Application No. PCT/CN2011/071490, mailed Jun. 9, 2011.

*Primary Examiner* — Redentor Pasia
(74) *Attorney, Agent, or Firm* — Bright IP Law Offices

(57) ABSTRACT

An implementation method and system, main control device and smart card for information transmission are provided. The method includes: the smart card notifying the main control device of the operating mode supported thereby; the smart card receiving a clock frequency returned by the main control device, and if the main control device determines that the smart card can support an externally provided clock frequency, the clock frequency is a second clock frequency; judging whether the smart card itself can support the second clock frequency, and if true, the smart card and the main control device carrying out information transmission based on the clock control signal of the second clock frequency; otherwise the smart card carrying out the transmission based on the dock control signal of the first clock frequency, and the main control device carrying out the transmission based on the clock control signal of the second clock frequency.

14 Claims, 4 Drawing Sheets

(56) References Cited

U.S. PATENT DOCUMENTS

| | | | |
|---|---|---|---|
| 6,138,029 A * | 10/2000 | Digabel | 455/502 |
| 6,138,918 A * | 10/2000 | Tarbouriech | 235/492 |
| 6,173,400 B1 * | 1/2001 | Perlman et al. | 713/172 |
| 6,419,159 B1 * | 7/2002 | Odinak | 235/492 |
| 6,760,858 B1 * | 7/2004 | Maugars | 713/600 |
| 2001/0034246 A1 * | 10/2001 | Hutchison et al. | 455/557 |
| 2008/0031449 A1 * | 2/2008 | Osen et al. | 380/210 |
| 2008/0189555 A1 * | 8/2008 | Sohn | 713/192 |
| 2009/0224046 A1 * | 9/2009 | Sung | 235/439 |

FOREIGN PATENT DOCUMENTS

| | | |
|---|---|---|
| CN | 101561894 A | 10/2009 |
| CN | 101859395 A | 10/2010 |

* cited by examiner

IMPLEMENTATION METHOD AND SYSTEM, MAIN CONTROL DEVICE AND SMART CARD FOR INFORMATION TRANSMISSION

CROSS REFERENCE TO RELATED APPLICATIONS

This application is the U.S. National Stage of International Patent Application No. PCT/CN2011/071490 filed on Mar. 3, 2011, which claims priority to Chinese Patent Application No, 201010176989.3 filed on May 14, 2010. Both the PCT Application and Chinese Application are hereby incorporated by reference in their entirety.

FIELD OF THE INVENTION

The present invention relates to a field of data network communication, and particularly to an implementation method and system, main control device and smart card for information transmission.

BACKGROUND OF THE INVENTION

Subscriber identity module card (Subscriber Identity Module, abbreviated as SIM card) is a special smart card, has been a standard contact integrated circuit (Integrated Circuit, IC) card at present. SIM card conforms the roles of the contact IC card (ISO7816 standard) and the specification of the European Telecommunications Standards Institute (ETSI) GSM11.11, etc. standard, and can implement the storage of the data (for example, when applied to terminals, being capable of storing the information, such as telephone book and short messages, etc.), and also can complete the subscriber identity authentication when the information is validated with legality (i.e., when validating, the personal identification number (PIN) of the party to be validated and the authentication key (Ki) are both correct), and can encrypt the subscriber information by adopting encryption arithmetic, etc. and furthermore SIM card also has the features, such as set-card separate operation, high safety in communication, and low cost, etc.

At present, SIM card chip and the terminals connect each other via 8 contacts, these 8 contacts will be simply described as follows:

(1) Power supply VCC (contact C1): the contact for connecting with a voltage source provided at terminals, usually, the manners of supplying to a SIM card including 5 V, 3 V and 1.8 V, most SIM card adopted at present can support 3 V/1.8 V, such that there is provided a boost circuit in a voltage-stabilizing circuit at terminals.

(2) Resetting RST (contact C2); the contact for transmitting the operation reset signal of the SIM card, and for performing the reset operation of the internal processor of the SIM card.

(3) Clock CLK (contact C3): the contact for transmitting a clock signal, SIM card usually adopting clock signal with two frequency, one is a reference clock signal with the frequency of 13 M/4, 3.25 MHz and the other one is a reference clock signal of 1.083 MHz.

(4) USB+(contact C4): the contact being a reserved interface for implementing the communication between SIM card and the USB interface.

(5) Ground terminal GND (contact C5): the contact being used for grounding.

(6) Programming voltage VPP (contact C6): the contact for supplying to the programming of the SIM card, in the terminals adopting SIM card at present, the contact being usually an empty foot or connecting with the supply cable of the VSIM power cable, the contact can support the single wire protocol (Single Wire Protocol, SWP), and being reserved for the function of supporting the near field communication (Near Field Communication, NFC).

(7) Data input/output (I/O) interface (contact C7): the contact being the data interface of the SIM card, for with the terminals together to carry out the internal information transmission communication of the SIM card.

(8) USB—(contact C8): the contact being a reserved interface for implementing the communication between the SIM card and USB interface.

At present, with respect the abovementioned 8 contacts (interfaces) of the SIM card, 5 of the contacts are mainly used, and the contact C4 or C8 is reserved to a high speed interface of the USB, the contact C6 is reserved to NFC.

At present, SIM card usually adopts USB interface as a high speed interface, USB is mainly divided into USB2.0 and USB1.1 standard. Wherein the transmission rate of USB1.1 standard can reach 12 Mbps theoretically, while the transmission rate of USB2.0 standard can reach 480 Mbps, it is by the aid of both contacts C4 and C8 on the SIM card when the communication based on these two standards is implemented.

The solution of USB set-card interface (Inter Chip USB, IC-USB) is the high speed SIM card standard established by European telecommunications standard institute (European Telecommunications Standards Institute, ETSI), in ETSI TS 102,600 there is defined the interface characteristic of IC-USB, while in ISO 7816-12 there is defined the electric interface of IC-USB and operation process of the same. At present, the rate of IC-USB supports 12 Mbps, and the maximum power consumption is required less than 80 mA. However IC-USB is an international standard, but since it supports the communication flat-form or terminals driven by IC-USB Host and IC-USB and it is not used extensively still, resulting in the related technology of the standard developing relative slowly. And the rate of 12 Mbps defined in the standard cannot meet the requirement to the width of the band needed by multimedia, furthermore it can produce higher power consumption and can increase the complexity degree of the software protocol when the technology is implemented, and since the system resources of the mobile terminal itself are very limited, this technology cannot be well applied to the mobile terminal.

In addition to SIM card, the abovementioned problem also exists when other smart cards communicate with a main control device such as terminals.

As to the problem in the related art that the smart card communicates with the main control device with low communication efficiency, high power consumption and high complexity degree, an effective solution has not yet been proposed at present.

SUMMARY OF THE INVENTION

In the view of this, with respect to the problem that the smart card communicate with the main control device with low communication efficiency, high power consumption and high complexity degree in the related art, there is provided an implementation method and system, main control device and smart card for information transmission in the present invention, it can improve the communication efficiency of the main control device and the smart card, reduce the complexity degree and power consumption.

In order to solve the above technical problems, the technical solution of the present invention is achieved by:

an implementation method for information transmission, comprising:

a smart card notifying a main control device of an operating mode supported thereby;

said smart card receiving a clock frequency returned by said main control device, wherein said returned clock frequency is determined by said main control device according to said notified operating mode, and when said main control device determines that said smart card supports an externally provided clock frequency according to the operating mode notified by said smart card, the clock frequency returned by said main control device is a second clock frequency, wherein said second clock frequency is higher than a default first clock frequency supported by said smart card; and said smart card judging whether said smart card itself can support said second clock frequency returned by said main control device, if true, said smart card and said main control device carry out information transmission on the basis of a clock control signal of said second clock frequency; or said smart card carries out frequency division on the clock control signal of said second clock frequency, and obtains a clock control signal of said first clock frequency, and the information transmission is carried out by said smart card based on the clock control signal of said first clock frequency and by said main control device based on the clock control signal of said second clock frequency, respectively.

Said smart card notifying said main control device of an operating mode supported thereby comprises: in response to a reset command from said main control device, notifying said main control device of said operating mode via the reset response command.

Said main control device returns said clock frequency to said smart card via a protocol parameter select request message.

After said main control device returns said clock frequency to said smart card, the implementation method further comprising: said smart card notifying said main control device of information representing whether said smart card supports said clock frequency via a protocol parameter select response message.

In the case where said smart card does not support an externally provided clock frequency, or said smart card cannot support said second clock frequency returned by said main control device, the method further comprises: said main control device and said smart card carrying out information transmission on the basis of a clock frequency before the operating mode is notified; or said main control device and said smart card carrying out information transmission on the basis of said first clock frequency.

Said operating mode notified to said main control device by said smart card comprises one of the following operating modes:

communication based on a high frequency asynchronous half duplex character transmission protocol and adopting said first clock frequency;

communication based on a high frequency asynchronous half duplex block transmission protocol and adopting said first clock frequency;

communication based on the high frequency asynchronous half duplex character transmission protocol and adopting said second clock frequency; and communication based on the high frequency asynchronous half duplex block transmission protocol and adopting said second clock frequency.

An implementation system for information transmission, comprising a main control device and a smart card, wherein said smart card is used for notifying the main control device of an operating mode supported thereby, receiving a clock frequency returned by said main control device, and judging whether the smart card itself can support a second clock frequency returned by said main control device, and if true, carrying out information transmission with said main control device on the basis of a clock control signal of said second clock frequency; or carrying out frequency division on a clock control signal of said second clock frequency, and obtaining a clock control signal of said first clock frequency, and when carrying out the information transmission, carrying out the information transmission based on a clock control signal of said first clock frequency; and said main control device is used for returning a clock frequency to said smart card according to said operating mode notified by said smart card, and carrying out information transmission based on a clock control signal of the second clock frequency, wherein if said main control device determines that said smart card can support operation at an externally provided clock frequency according to the operating mode notified by said smart card, the clock frequency returned by said main control device is said second clock frequency, wherein said second clock frequency is higher than a default first clock frequency supported by said smart card.

A smart card, comprising:

a notification module for notifying an operating mode supported by said smart card to a main control device;

a receiving module for receiving a clock frequency returned by said main control device;

a judgement module for judging whether said smart card itself can support a second clock frequency returned by said main control device;

a frequency divider for carrying out frequency division on a clock control signal of said second clock frequency, and obtaining a clock control signal of said first clock frequency; and a transmission module for, if the judgment result of said judgment module is yes, carrying out information transmission between said smart card and said main control device on the basis of a clock control signal of said second clock frequency; or for, if said smart card is based on the clock control signal of said first clock frequency and said main control device is based on the clock control signal of said second clock frequency, carrying out the information transmission between said smart card and said main control device.

A main control device, comprising:

a sending module for returning a clock frequency to a smart card in response to an operating mode notified by said smart card;

a determination module for determining a clock frequency to be returned by said sending module according to the operating mode notified by said smart card, wherein if it is determined that said smart card can support operation at an externally provided clock frequency according to the operating mode notified by said smart card, the returned clock frequency is a second clock frequency, wherein said second clock frequency is higher than a default first clock frequency supported by said smart card; and a transmission module for implementing information transmission of said main control device and said smart card based on a clock control signal of said second clock frequency.

By way of the abovementioned technical solution in the present invention, the main control device, according to whether a smart card can support an external high frequency clock, and the smart card together complete the negotiation of the clock frequency, such that if the smart card can support a high frequency clock, the smart card carries out an information transmission with the main control device based on a clock signal with higher frequency, thereby effectively increasing the communication efficiency and improving the communication capability of the main control device and the smart card without adding the complexity degree and energy consumption of the communication.

DETAILED DESCRIPTION OF THE INVENTION

As to the problem that the limitation to the application of the main control device and the smart card resulted from the low efficiency of the information transmission in the smart card and the main control device in the related art, it is disclosed in the present invention that a negotiation about the frequency of the clock signal is carried out between the main control device and the smart card, if the smart card can support a clock signal of high frequency, the main control device and the smart card carry out the information transmission based on the high frequency, such that the communication efficiency between the smart card and the main control card can be effectively increased, the problem that high communication complexity degree and high power consumption of the communication based on the USB protocol in the related art can be avoided, so the capability of the main control device and the smart card can be effectively improved.

Figure 1:
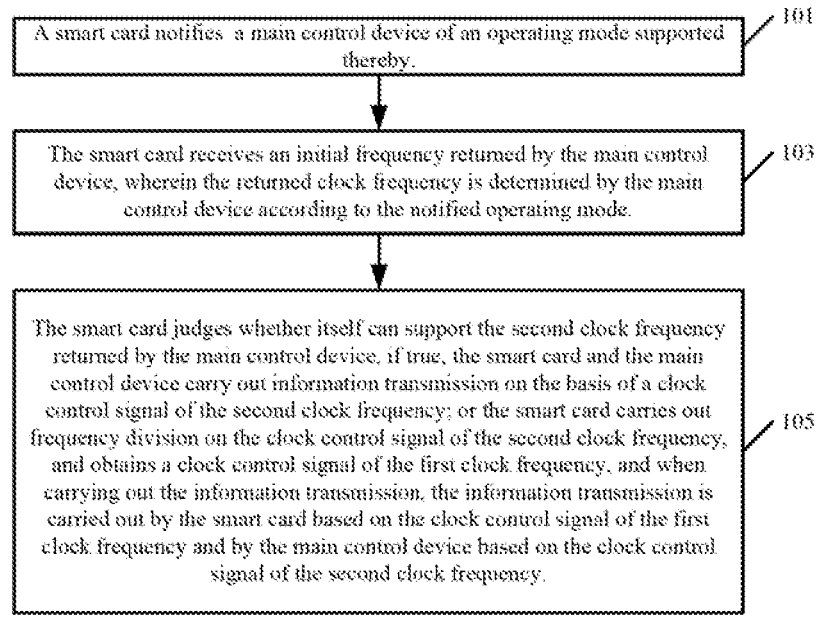
FIG. 1 is a schematic diagram of the flowchart of an implementation method for information transmission according to the embodiments of the present invention.

FIG. 1 is a schematic diagram of the flowchart of an implementation method for information transmission according to the embodiments of the present invention, as shown in FIG. 1, the implementation method comprising:

Step 101 a smart card notifying a main control device of an operating mode supported thereby.

Step 103, the smart card receiving a clock frequency returned by the main control device, wherein the returned clock frequency is determined by the main control device according to the notified operating mode.

In the present step, if the main control device determines that the smart card can support an externally provided clock frequency according to the operating mode notified by the smart card, the clock frequency returned by the main control device is a second clock frequency, wherein the second clock frequency is the higher one of the clock frequencies supported by the main control device, and the frequency is higher than the default frequency used by a smart card defined in the present protocol (in the present text, the clock frequency usually supported by a smart card in the existing protocol being called as a first clock frequency).

Step 105, judging by the smart card whether itself can support the second clock frequency returned by the main control device, if true, the smart card and the main control device carry out information transmission on the basis of a clock control signal of the second clock frequency; otherwise the smart card carries out frequency division on the clock control signal of the second clock frequency, and obtains a clock control signal of the first clock frequency, and when carrying out the information transmission, the information transmission is carried out by the smart card based on the clock control signal of the first clock frequency and by the main control device based on the clock control signal of the second clock frequency.

By way of the abovementioned process, the main control device, such as a terminal connected to the smart card or other device used for controlling the smart card, according to whether the smart card can support an external high frequency clock, work with the smart card together to complete the negotiation, such that if the smart card can support a high frequency clock, the smart card carries out an information transmission with the main control device based on a clock signal with higher frequency, thereby effectively increasing the communication efficiency and improving the communication capability of the main control device and the smart card without adding the complexity degree and energy consumption of the communication.

Wherein the abovementioned treatment process can be performed during the reset process of the smart card, at this time, the smart card can, in response to the reset command (RESET) from the main control device, notify the operating mode to the main control device via a reset response command (ATR).

Furthermore, the main control device returns a clock frequency to the smart card via the protocol parameters selection request message (PPS Request). For example, if the second clock frequency is returned, the value of the second clock frequency can be carried in the PPS request message by the main control device. The main control device then sends the PPS request message to the smart card, such that the second clock frequency is notified to the smart card.

After returning by the main control device a clock frequency to the smart card, the smart card notifies the main control device whether the smart card can support the clock frequency via a protocol parameter select response message (PPS Response). The PPS response message includes information representing whether the smart card can support adoption of the second clock frequency.

Furthermore if the main control device, according to the operating mode notified by the smart card, determines the smart card cannot support the externally provided clock frequency, the main control device and the smart card carry out information transmission on the basis of a clock frequency before the operating mode is notified; or the main control device and the smart card carry out information transmission on the basis of the first clock frequency, i.e. with no change to the currently used clock frequency, or directly adopting the default first clock frequency.

Furthermore, if the frequency provided by the main control device is higher than the highest frequency supported by the smart card (such as the default frequency supported by the smart card in the protocol is 1 MHz, the highest frequency supported by the smart card is 20 MHz, but the frequency returned by the main control device is 50 MHz), there is also no change to the currently used clock frequency, or the main control device and the smart card directly carry out the information transmission by adopting the default first clock frequency.

In addition to a negotiation during the reset process, the main control device and the smart card can also perform the clock frequency and the operating mode negotiation at other moments.

Due to the achievement of the negotiation about the operating mode and the clock frequency according to the present embodiment, therefore in addition to being capable of continuing to use the existing operating mode, the main control device and the smart card can also adopt the following operating modes: based on a high frequency asynchronous half duplex character transmission protocol and using the first clock frequency; based on a high frequency asynchronous half duplex block transmission protocol and using the first clock frequency; based on a high frequency asynchronous half duplex character transmission protocol and using the second clock frequency; and based on a high frequency asynchronous half duplex block transmission protocol and using the second clock frequency.

The implementation method of information transmission of the present invention will be described in detail, for example, with the terminals being a main control device and the SIM card being a smart card hereinafter.

Figure 2:
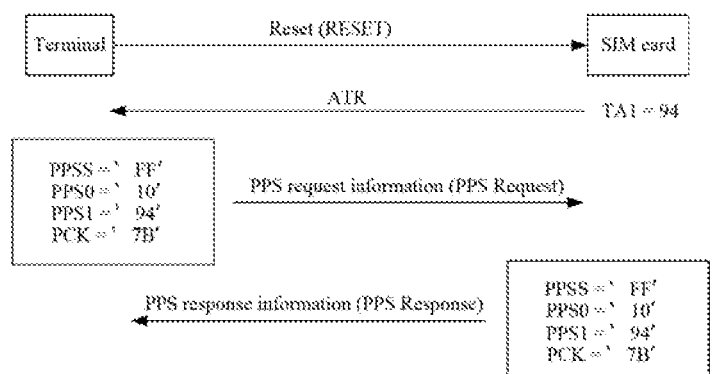
FIG. 2 is a schematic diagram of the signaling flowchart of a process example of an implementation method for information transmission according to the embodiments of the present invention.

FIG. 2 is a flowchart diagram of the signaling of the implementation method of information transmission in the related art. As shown in FIG. 2, during the process of the SIM card being powered on/reset, the terminals send (the supported rate (F=512, D=8)) a reset command (RESET command) to the SIM card first. After receiving the reset command, the SIM card returns ATR to the terminals. After that, the terminals initiate a PPS negotiation process, i.e. sending the PPS request information to SIM card, performing the PPS negotiation, wherein, PPSS='FF', PPS0='10', PPS1='94' and PCK='7B'. If the negotiation is successful, the terminals and the SIM card carry out the information transmission according to the negotiation transmission factor F (clock rate transformation factor) and D (baud rate regulation factor).

In order to implement the negotiation of the second clock frequency more expediently; it is needed to extend on the basis of the existing coding and improve the negotiation process for being compatible with the existing SIM card, it is described about the negotiation process between the terminals and SIM card hereinafter.

Any one of the existing reserved values can be redefined in the present invention.

Particularly, the usage of the frequency can be divided into two cases:

in case (1), using the existing frequency protocol (the first clock frequency), the function of the control signal of high frequency is to use the contacts again or perform the frequency division to application of other SIM, at this time the transmission rate on the ISO7816 complies with the existing protocol; and in case (2), directly using the external frequency (the second frequency), there is no frequency division on the clock control signal of the second clock frequency.

Preferably, in order to sufficiently express that the high clock can be supported, b4, b3=10 can be defined as the capability identifier of supporting the high frequency by the SIM card, it is particularly as follows:

1000 communication based on a high frequency asynchronous half duplex character transmission protocol and using the first clock frequency of the existing protocol;

1001 communication based on a high frequency asynchronous half duplex block transmission protocol and using the first clock frequency of the existing protocol;

1010 communication based on a high frequency asynchronous half duplex character transmission protocol and using an external second clock frequency;

1011 communication based on a high frequency asynchronous half duplex block transmission protocol and using an external second clock frequency;

After extended, the value of the parameter T is still the coding value definition of b4 to b1, the operating mode of the smart card is particularly defined as follows:

T=0: asynchronous half duplex character transmission protocol;

T=1: asynchronous half duplex block transmission protocol;

T=2 and T=3: being reserved for a Full-Duplex Operation in the future;

T=4: being reserved for the enhancing asynchronous half duplex character transmission protocol;

T=8: communication based on a high frequency asynchronous half duplex character transmission protocol and using the frequency in the existing protocol;

T=9: communication based on a high frequency asynchronous half duplex block transmission protocol and using the frequency in the existing protocol;

T=10: communication based on a high frequency asynchronous half duplex character transmission protocol and directly using an external frequency;

T=11: communication based on a high frequency asynchronous half duplex block transmission protocol and directly using an external frequency;

T=14: a transmission protocol not standardized by ISO/IEC JTC1 SC17;

T=15: not a transmission protocol, only representing the type of the omni-distance interface byte; and other values being reserved for the usage in the future.

The operating mode supported by a SIM card is one of the abovementioned operating modes, such that the operating mode notified to the main control device by the SIM card is one of the abovementioned operating modes.

Figure 3:
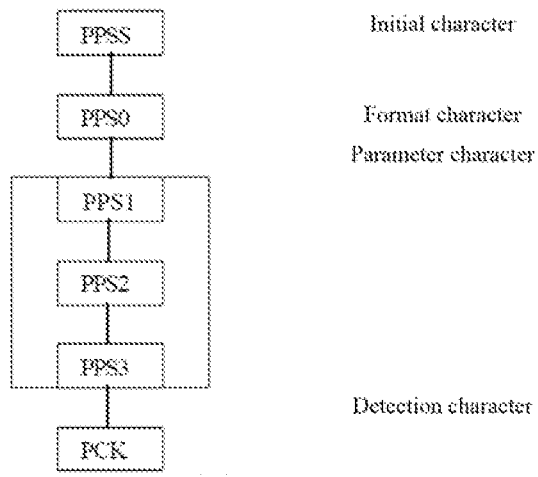
FIG. 3 is a schematic diagram of the structure of a PPS request message when the PPS negotiation is carried out in an implementation method for information transmission according to the embodiments of the present invention.

The request and the response structure of the protocol parameter select (Protocol Parameter Select, PPS) can be extended in the present invention, as follows, in which: FIG. 3 is a schematic diagram of the structure of PPS in the related art, in which PPSS (initial character), PPS0 (format character), PPS1, PPS2, PPS3 (PPS1, PPS2 and PPS3 all collectively called as parameter character), and PCK (detection character) are included, there is added a PPS4 behind of the PPS3 field in the present invention, PPS4 is used to transmit the clock frequency of the negotiation (such as the second clock frequency) to the SIM card, particularly it can perform the transmission by directly adopting the high frequency coding or the multiple of the negotiation value.

Figure 4:
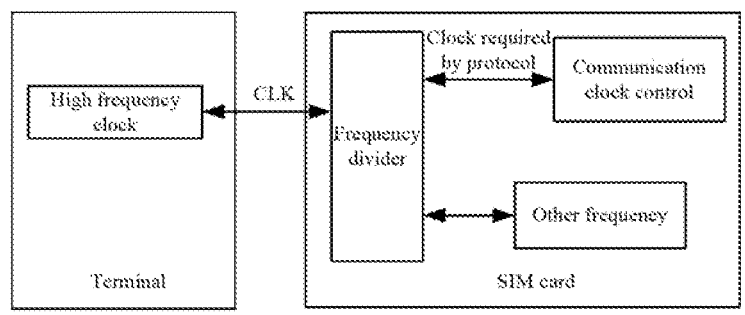
FIG. 4 is a schematic diagram of the flowchart for carrying out frequency division by a frequency divisor disposed on the sides of the SIM card according to an implementation method of information communication of the embodiments of the present invention.

Furthermore the negotiation bit b8 can be the existing bit of PPS4.

Wherein for performing the process of the frequency division, it is necessary to have a frequency divider at the sides of the main control device, or the SIM card, or outside the main control device and the SIM card, there is shown the situation of the frequency divider disposed the interior of the SIM card in FIG. 4, wherein a path of the clock (the clock required by the protocol) outputted by the frequency divider is used to the communication clock control of the SIM card, and the other path of the clock can output the clock with other frequencies. The situation of disposing the frequency divider outside the SIM card is not enumerated anymore.

By adopting a frequency divider, the SIM card can be compatible with a clock control signal of high frequency, and can be compatible with the primary clock configuration (low frequency clock configuration) on the SIM card, and the frequency divider can configure multiple paths of outputs, the outputs of one path can be the clock signal of the high frequency data bus (such as the serial clock (SCK) lines of the high speed synchronization serial ports (SPI)), the outputs of the other path are used to provide the control of the communication clock of the SIM card, the output clock of the other paths can be set as other frequencies according to the requirement.

Here, the control of the communication clock usually comprises: the related control of the communication clock such as the width of the data bit, the length of the character/frame, the time interval of sending to the character, the time interval between returning INS and the subsequent bite, etc. particularly, the clock can comply with the ISO7816 standard and ETSI GSM11.11.

To be completely compatible with the existing SIM card, the clock frequency negotiation can be performed via changing the related protocol.

The negotiation treatment process of the embodiment of the present invention will be described in conjunction with FIG. 5 hereinafter.

Figure 5:
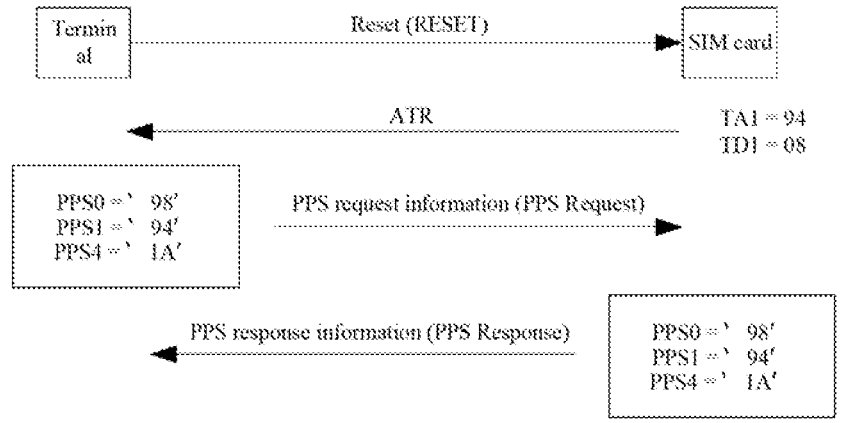
FIG. 5 is a schematic diagram of the signaling flowchart of another process example of an implementation method for information transmission according to the embodiments of the present invention.

As shown in FIG. 5, at first the SIM card is powered on and reset by switching on the contacts first and then activating a cold reset, if the cold reset is fault, activating the hot reset. If the hot reset is not also successful, the contacts are released and an error is reported. After the cold reset or the hot reset is successful, the SIM card responses ATR.

In the ATR, the T parameters in the TD (i) are written according to the extended parameters, i.e. T can be 0x8, 0x9, 0xa and 0xb being sent to the terminals via ATR.

According the T parameters of TD (i) in ATR, the terminals judge whether SIM card can support the high speed frequency mode.

If there is no TD (i) field or T parameters are not 0x8, 0x9, 0xa and 0xb, processing according to the flowchart of the ordinary SIM card.

Otherwise the PPS negotiation process is carried out, b8 of the PPS0 is set as 1, it means that PPS4 is existed (such as PPS0='98', it means that there is a frequency to be negotiated), the coding values of b4 to b1 are written according to the extended definition. In the present embodiment, PPS4 can be written as ox1A, it means that the external clock frequency is 26 M.

According to the values of T and PPS4, the SIM card can perform the corresponding calculation or process. If T=8, PPS4=0x1A, 26 M will be divided into the frequency required by the protocol via the frequency divider (corresponding to F=512, D=8 and the maximum frequency of the clock being 5 M). If T=10 and PPS4=0x1A, the SIM card can carry out the communication by directly using 26 M.

When judging whether the negotiation is successful, if the response message of PPS can correctly respond to the request message of PPS, the exchange process of PPS is performed successfully; when the response message of PPS satisfies with the response message of PPSS=the request message of PPSS (wherein the meaning of the response message of XX=the request message of XX appeared herein is referred to as that the content carried in the response message is the same as the content carried in the request message), suggesting that the exchange of PPS is successful.

Particularly, when the SIM card is responding to PPS0, b1 to b4 are needed to be returned.

When responding to PPS1, b5 is needed to be returned and b5 can be set as 0 or 1, if b5=1 the response message of PPS1=the request message of PPS1, it is represented that the exchange process of PPS1 is successful; if b5=0 there is no response of PPS1, it is represented that the exchange process of PPS1 is fault, the existing F and D should be used continuously.

When responding to PPS2, b6 is needed to be returned and b5 can be set as 0 or 1, if b6=1 the response message of PPS2=the request message of PPS2, it is represented that the exchange process of PPS2 is successful; if b6=0 there are no response message of PPS1 and request message of PPS2, it is represented that the exchange process of PPS2 is fault.

When responding to PPS3, b7 is returned and b7 can be set as 0 or 1, if b7=1 the response message of PPS3=the request message of PPS3, it is represented that the exchange process of PPS3 is successful; if b7=0 there are no response message of PPS3 and request message of PPS3, it is represented that the exchange process of PPS3 is fault.

The corresponding presence bit b8 of PPS4 is extended in the present invention, when SIM card is responding to PPS4, b8 is returned and b8 can be set as 0 or 1; if b8=1 the response message of PPS4=the request message of PPS4, it is represented that PPS4 exchange process is successful; if b8=0 there are no response message of PPS4 and the request message of PPS4, it is represented that the process of PPS4 exchange is fault.

So long as the exchange process of anyone of PPS1, PPS2, PPS3 and PPS4 is successful, the PPS exchange is considered as being successful, otherwise the PPS exchange is considered to be fault. But because the negotiation of the clock frequency provided in the present invention is achieved via the request message and the response message of b8 and the corresponding PPS4, therefore only if b8=1, i.e. PPS4 exchange is successful, the terminals and SIM card can carry out the information transmission by adopting higher clock frequency (such as the second clock frequency).

If the negotiation is successful (i.e. in the response message of PPS returned by SIM card there is carried a message representing SIM card can support a higher second clock frequency carried in the request message of PPS), the information transmission is carried out according to the clock frequency of the negotiation, such that SIM card and terminals can carry out the information transmission based on the higher clock frequency, so the efficiency of the communication is effectively increased.

While if the negotiation is fault (i.e., in the response message of PPS returned by SIM card there is a message representing SIM card cannot support a higher second clock frequency carried in the request message of PPS) and the SIM card works according to the existing flow.

Furthermore with respect to other types of smart card and other forms of main control device, the same treatment can also be adopted and the similar effect will be reached, so it will not be described in detail one by one in the present invention anymore.

By way of the abovementioned treatment, the main control device, according to whether the smart card can support factors, such as a high frequency clock, etc. enables the main control device and the smart card to complete the negotiation of the clock frequency, such that in the case of the smart card can support a high frequency clock, the smart card carries out an information transmission with the main control device based on a clock signal with higher frequency, thereby effectively increasing the communication efficiency and improving the communication capability of the main control device and the smart card without adding the complexity degree and energy consumption of the communication; furthermore via the clock frequency negotiation and the frequency division treatment carried out possibly thereafter, it enables the clock frequency of the smart card to match with that of the clock of a plurality kinds interface bus protocol, such that with the main control device together carry out the information transmission by a plurality of forms.

An implementation system for information transmission is also provided according to the embodiments of the present invention.

Figure 6:
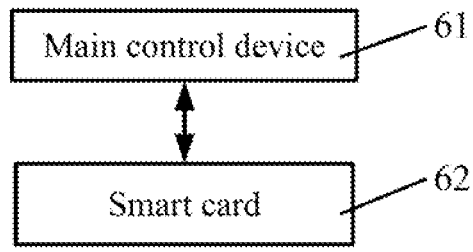
FIG. 6 is a schematic diagram of the structure of an implementation system for information transmission according to the embodiments of the present invention.

As shown in FIG. 6, an implementation system for information transmission according to the embodiments of the present invention comprises a main control device 61 and a smart card 62. Wherein the smart card 62 is used for notifying the main control device of an operating mode supported thereby 61, receiving a clock frequency returned by the main control device 61, and judging whether the smart card 62 itself can support a second clock frequency returned by the main control device 61, and if true, it with the main control device 61 together carry out information transmission on the basis of a clock control signal of the second clock frequency; or carrying out frequency division on a clock control signal of the second clock frequency, and obtaining a clock control signal of the first clock frequency, and when carrying out information transmission, carrying out information transmission based on a clock control signal of the first clock frequency; and the main control device 61 is used for returning a clock frequency to the smart card 62 according to the operating mode notified by the smart card 62, and carrying out information transmission based on a clock control signal of the second clock frequency, wherein if the main control device 61 determines that the smart card 62 supports the externally provided clock frequency according to the operating mode notified by the smart card 62, the clock frequency returned by the main control device 61 is a second clock frequency, in which the second clock frequency is higher than the first clock frequency acquiesced and supported by the smart card 62.

Furthermore, since the main control device 61 and the smart card 62 can carry out the information transmission based on the higher clock frequency, therefore in addition the existing operating mode, the operating modes notified to the main control device 61 by the smart card 62 further include one of the following operating modes: based on a high frequency asynchronous half duplex character transmission protocol and using the first clock frequency; based on a high frequency asynchronous half duplex block transmission protocol and using the first clock frequency; based on a high frequency asynchronous half duplex character transmission protocol and using the second clock frequency; and based on a high frequency asynchronous half duplex block transmission protocol and using the second clock frequency.

The process of the smart card 62 notifying the main control device 61 of the operating mode, the process of the clock frequency returned by the main control device 61 and how to expand on the base of the existing protocol are all described hereinbefore, so it is not repeated anymore herein.

There is also provided a main control device in the embodiments of the present invention.

Figure 7:
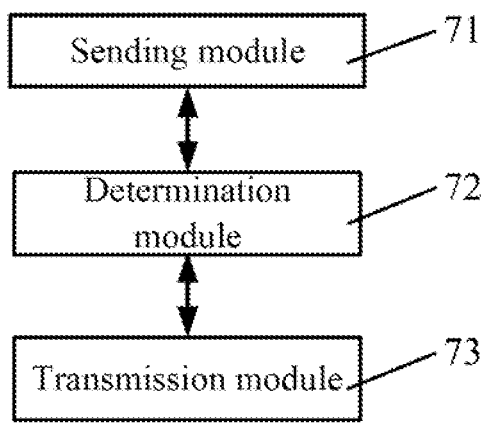
FIG. 7 is a schematic diagram of the structure of a main control device according to the embodiments of the present invention.

As shown in FIG. 7, the main control device according to the embodiments of the present invention comprises:

a sending module 71 for returning a clock frequency to the smart card in response to an operating mode notified by the smart card;

a determination module 72, connected to the sending module 71, for determining a clock frequency to be returned by the sending module according to the operating mode notified by the smart card, wherein if it is determined that the smart card supports the operation at the externally provided clock frequency according to the operating mode notified by the smart card, the returned clock frequency is a second clock frequency, wherein the second clock frequency is higher than the first clock frequency acquiesced and supported by the smart card; and a transmission module 73, connected to the determination module 72, for implementing information transmission between the main control device and the smart card based on a clock control signal with frequency of the second clock frequency.

In this way, the main control device can according to whether the smart card supports an external high frequency clock, with the smart card together complete the negotiation, such that if the smart card can support a high frequency clock, the smart card carries out an information transmission with the main control device based on a clock signal with higher frequency, thereby effectively increasing the communication efficiency and improving the communication capability of the main control device and the smart card without adding the complexity degree and energy consumption of the communication.

There is also provided a smart card in the embodiments of the present invention.

Figure 8:
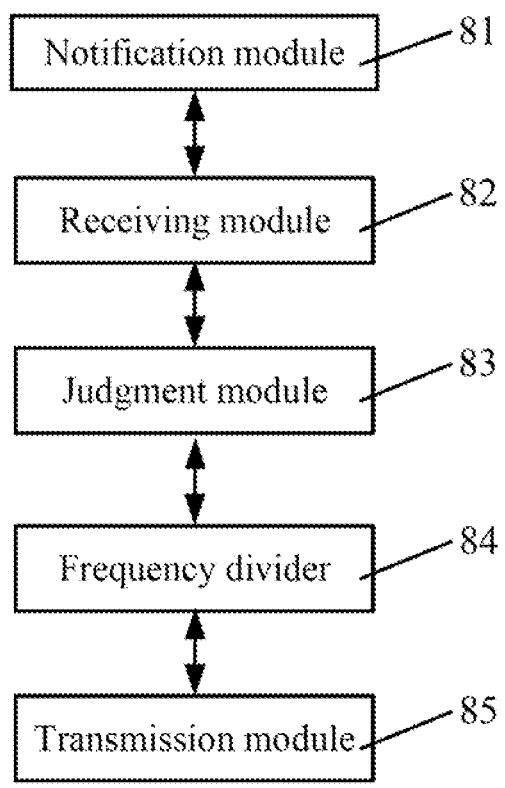
FIG. 8 is a schematic diagram of the structure of a smart card according to the embodiments of the present invention.

As shown in FIG. 8, the smart card according to the embodiments of the present invention comprises:

a notification module 81 for notifying an operating mode supported by the smart card to a main control device;

a receiving module 82 for receiving a clock frequency returned by the main control device;

a judgment module 83 for judging whether the smart card itself can support a second clock frequency returned by the main control device;

a frequency divider 84 for earning out frequency division on a clock control signal of the second clock frequency, and obtaining a clock control signal with frequency of the first clock frequency; and a transmission module 85 for, if the judgment result of the judgment module is yes, achieving the information transmission between the smart card and the main control device on the basis of a clock control signal of the second clock frequency; or for, if the smart card is based on the clock control signal of the first clock frequency and the main control card is based on the clock control signal of the second clock frequency, carrying out information transmission between the smart card and the main control device.

To sum up, by way of the abovementioned technical solution of the present invention, the main control device according to whether the smart card can support a negotiation process initiated by the factors, such as a high frequency clock, etc. enables the main control device and the smart card to complete the negotiation of the clock frequency, such that if the smart card can support a high frequency clock, and the smart card carries out an information transmission with the main control device based on a clock signal with higher frequency, and enables the main control device and the smart card to negotiate the best operating mode, thereby effectively increasing the communication efficiency and improving the communication capability of the main control device and the smart card without adding the complexity degree and energy consumption of the communication.

Above description is only to illustrate the preferred embodiments but not to limit the present invention, and any amendments, equivalent substitutions, improvements etc. within the spirit and principle of the present invention are all concluded in the scope of protection of the present invention.

What is claimed is:

1. An implementation method for information transmission, comprising:
    notifying, by a smart card, a main control device of an operating mode supported thereby;
    receiving, by said smart card, a clock frequency returned by said main control device, wherein said returned clock frequency is determined by said main control device according to said notified operating mode, and when said main control device determines that said smart card supports an externally provided clock frequency according to the operating mode notified by said smart card, the clock frequency returned by said main control device is a second clock frequency, wherein said second clock frequency is higher than a default first clock frequency supported by said smart card; and
    judging, by said smart card, whether said smart card itself can support said second clock frequency returned by said main control device, if true, said smart card and said main control device carry out information transmission on the basis of a clock control signal of said second clock frequency; otherwise said smart card carries out frequency division on the clock control signal of said second clock frequency, and obtains a clock control signal of said first clock frequency, and the information transmission is carried out by said smart card based on the clock control signal of said first clock frequency and by said main control device based on the clock control signal of said second clock frequency, respectively.

2. The implementation method according to claim 1, wherein said smart card notifying said main control device of said operating mode supported thereby comprises:
    in response to a reset command from said main control device, said smart card notifying said main control device of said operating mode via a reset response command.

3. The implementation method according to claim 1, wherein said main control device returns said clock frequency to said smart card via a protocol parameter select request message.

4. The implementation method according to claim 3, wherein, after said main control device returns said clock frequency to said smart card, the method further comprises:
    said smart card notifying said main control device of information representing whether said smart card supports said clock frequency via a protocol parameter select response message.

5. The implementation method according to claim 1, wherein, when said smart card cannot support an externally provided clock frequency, or said smart card cannot support said second clock frequency returned by said main control device, the method further comprises: said main control device and said smart card carrying out an information transmission on the basis of a clock frequency before the operating mode is notified; or said main control device and said smart card carrying out an information transmission on the basis of said first clock frequency.

6. The implementation method according to claim 1, wherein said operating mode notified of said main control device by said smart card comprises one of the following operating modes:
    communication based on a high frequency asynchronous half duplex character transmission protocol and adopting said first clock frequency;
    communication based on a high frequency asynchronous half duplex block transmission protocol and adopting said first clock frequency;
    communication based on the high frequency asynchronous half duplex character transmission protocol and adopting said second clock frequency; and
    communication based on the high frequency asynchronous half duplex block transmission protocol and adopting said second clock frequency.

7. An implementation system for information transmission, wherein the system comprises a main control device and a smart card, wherein
    said smart card is used for notifying the main control device of an operating mode supported thereby, receiving a clock frequency returned by said main control device, and judging whether the smart card itself can support a second clock frequency returned by said main control device, and if true, carrying out information transmission with said main control device on the basis of a clock control signal of said second clock frequency; otherwise carrying out frequency division on a clock control signal of said second clock frequency, and obtaining a clock control signal of said first clock frequency, and when carrying out the information transmission, carrying out the information transmission based on a clock control signal of said first clock frequency; and
    said main control device is used for returning a clock frequency to said smart card according to said operating mode notified by said smart card, and carrying out information transmission based on a clock control signal of the second clock frequency, wherein if said main control device determines that said smart card can support operation at an externally provided clock frequency according to the operating mode notified by said smart card, the clock frequency returned by said main control device is said second clock frequency, wherein said second clock frequency is higher than a default first clock frequency supported by said smart card.

8. The implementation system according to claim 7, wherein said operating mode notified of said main control device by said smart card comprises one of the following operating modes:
    communication based on a high frequency asynchronous half duplex character transmission protocol and adopting said first clock frequency;
    communication based on a high frequency asynchronous half duplex block transmission protocol and adopting said first clock frequency;
    communication based on the high frequency asynchronous half duplex character transmission protocol and adopting said second clock frequency; and
    communication based on the high frequency asynchronous half duplex block transmission protocol and adopting said second clock frequency.

9. A smart card, comprising:
    a notification module for notifying an operating mode supported by said smart card to a main control device;

a receiving module for receiving a clock frequency returned by said main control device;

a judgement module for judging whether said smart card itself can support a second clock frequency returned by said main control device;

a frequency divider for carrying out frequency division on a clock control signal of said second clock frequency, and obtaining a clock control signal of said first clock frequency; and a transmission module for, if the judgment result of said judgment module is yes, carrying out information transmission between said smart card and said main control device on the basis of a clock control signal of said second clock frequency; otherwise for, if said smart card is based on the clock control signal of said first clock frequency and said main control device is based on the clock control signal of said second clock frequency, carrying out the information transmission between said smart card and said main control device.

10. The implementation system according to claim 7, wherein said main control device comprises:

a sending module for returning the clock frequency to said smart card in response to said operating mode notified by said smart card;

a determination module for determining the clock frequency to be returned by said sending module according to the operating mode notified by said smart card; and a transmission module for implementing information transmission between said main control device and said smart card based on the clock control signal of said second clock frequency.

11. The implementation method according to claim 2, wherein said operating mode notified of said main control device by said smart card comprises one of the following operating modes:

communication based on a high frequency asynchronous half duplex character transmission protocol and adopting said first clock frequency;

communication based on a high frequency asynchronous half duplex block transmission protocol and adopting said first clock frequency;

communication based on the high frequency asynchronous half duplex character transmission protocol and adopting said second clock frequency; and communication based on the high frequency asynchronous half duplex block transmission protocol and adopting said second clock frequency.

12. The implementation method according to claim 3, wherein said operating mode notified of said main control device by said smart card comprises one of the following operating modes:

communication based on a high frequency asynchronous half duplex character transmission protocol and adopting said first clock frequency;

communication based on a high frequency asynchronous half duplex block transmission protocol and adopting said first clock frequency;

communication based on the high frequency asynchronous half duplex character transmission protocol and adopting said second clock frequency; and communication based on the high frequency asynchronous half duplex block transmission protocol and adopting said second clock frequency.

13. The implementation method according to claim 4, wherein said operating mode notified of said main control device by said smart card comprises one of the following operating modes:

communication based on a high frequency asynchronous half duplex character transmission protocol and adopting said first clock frequency;

communication based on a high frequency asynchronous half duplex block transmission protocol and adopting said first clock frequency;

communication based on the high frequency asynchronous half duplex character transmission protocol and adopting said second clock frequency; and communication based on the high frequency asynchronous half duplex block transmission protocol and adopting said second clock frequency.

14. The implementation method according to claim 5, wherein said operating mode notified of said main control device by said smart card comprises one of the following operating modes:

communication based on a high frequency asynchronous half duplex character transmission protocol and adopting said first clock frequency;

communication based on a high frequency asynchronous half duplex block transmission protocol and adopting said first clock frequency;

communication based on the high frequency asynchronous half duplex character transmission protocol and adopting said second clock frequency; and communication based on the high frequency asynchronous half duplex block transmission protocol and adopting said second clock frequency.

\* \* \* \* \*